Sept. 23, 1952  J. F. ZALESKI  2,611,804
MEASURING APPARATUS
Filed Jan. 28, 1948  3 Sheets-Sheet 1

Inventor
JOHN F. ZALESKI
By H. S. Mackey
Attorney

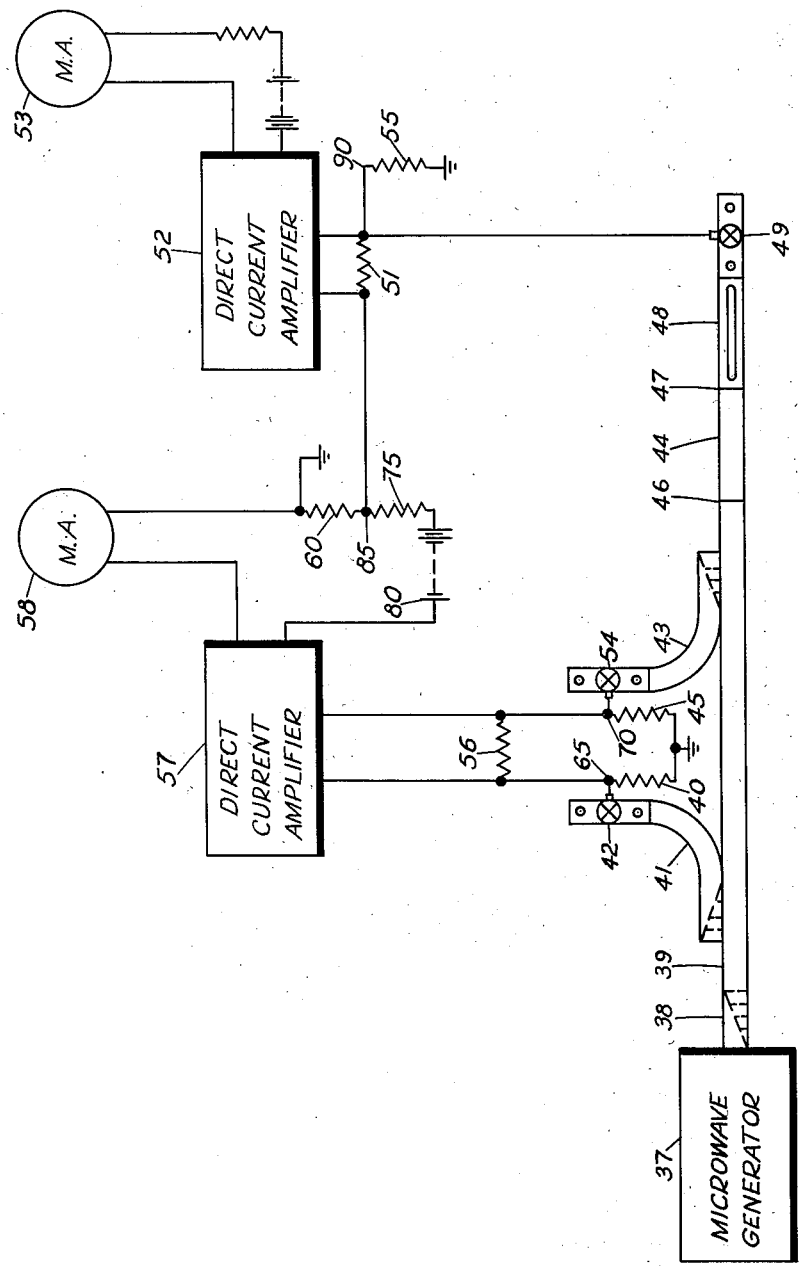

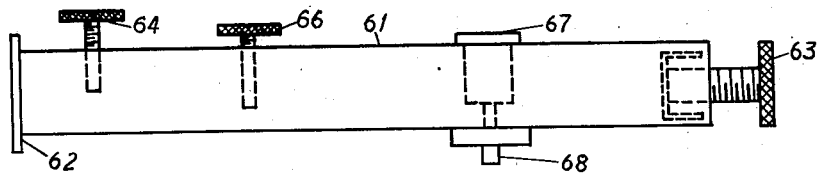
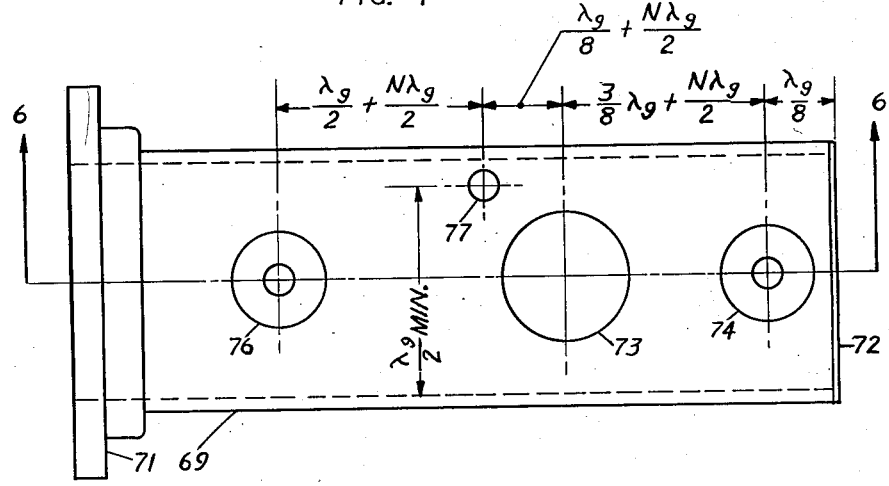
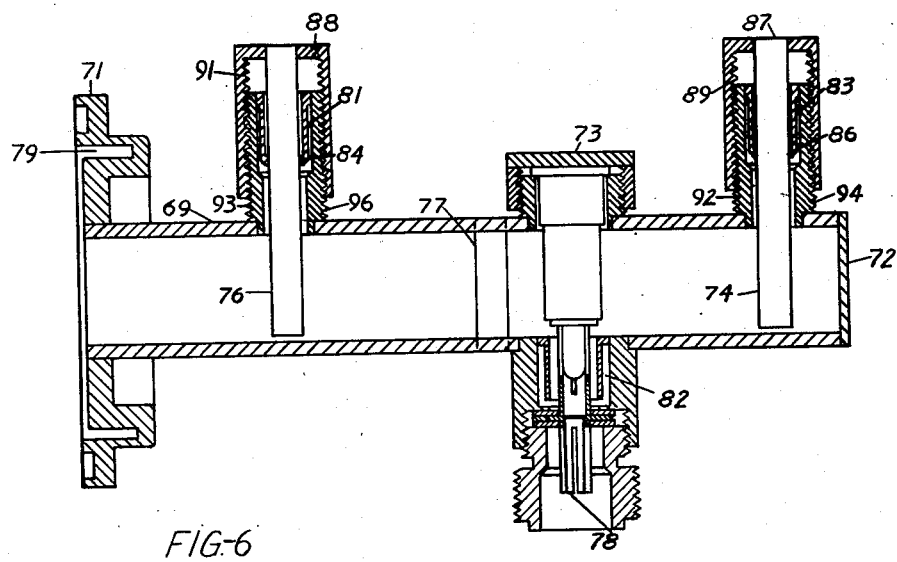

Patented Sept. 23, 1952

2,611,804

UNITED STATES PATENT OFFICE 2,611,804

MEASURING APPARATUS

John F. Zaleski, Queens Village, N. Y., assignor to General Precision Laboratory Incorporated, a corporation of New York Application January 28, 1948, Serial No. 4,869

4 Claims. (Cl. 175—183)

The present invention relates to a new and improved method of and apparatus for measuring variations in dielectrics wherein signal energies having wavelengths in the microwave region are employed.

In general the invention provides a novel and efficient method of and apparatus for measuring conductive components and inherent variations in dielectrics and has for its particular purpose the measurement and comparison of amounts of water in various non-conductors and semi-conductors by measuring the amount of microwave energy reflected by various non-conductors or semi-conductors or by measuring the amount of energy absorbed by such substances.

Additionally the same measurements can be advantageously used to determine the amounts of conductive impurities in such substances or to act as a means for determining the dielectric quality of such substances, such determination being relatively simple in its operation and capable of being accomplished by even unskilled persons.

In accordance with one preferred embodiment of the invention microwaves directed through a hollow wave guide upon the material to be measured are partly absorbed, partly reflected and partly transmitted. The proportion of the original microwave energy which is reflected will vary in accordance with the degree in which the material to be measured is conductive. It may be conductive because of absorbed or adsorbed water, because of contained conductive impurities and/or because of inherent dielectric imperfection. The degree of reflectivity can be due to any or all of these causes and this degree can vary from sample to sample. The degree of reflectivity will also depend on the microwave length directed upon the sample.

The invention requires the establishment of known relations between the particular quantity to be measured and the microwave behavior, for instance, by subjecting samples of known water content, other known conductive impurities, or known inherent dielectric imperfection to the microwave radiation and observing the result. This calibration of the equipment in terms of known samples will permit estimation of the desired quality of an unknown sample, the other two measurable qualities being known.

The microwave radiation which is reflected from the material sets up standing waves in the hollow wave guide, and both the phase and the amplitude of these standing waves will depend upon the degree of reflectivity from the sample. A microwave detector such as a probe and rectifying detector is fixed in the wave guide or coupled to it at any point where the standing waves exist, and the detector output is connected to an indicating means, such as an amplifier and millivoltmeter. The indications of this meter will then bear a relation to the quality under measurement, and if the equipment has been calibrated, these indications will permit rapid and easy quantitative estimation of that quality in an unknown sample.

In accordance with another preferred embodiment of the invention microwaves directed through a hollow wave guide upon the material to be measured are partly absorbed, partly reflected and partly transmitted. The proportion of the original microwave energy which is transmitted will vary in accordance with the degree with which the material to be measured is conductive. This degree of transmission can be due to any or all of three causes, just as in the case of reflected energy.

By means of a directional coupler, a small proportional amount of the original microwave energy is drained off and rectified as for instance, in a crystal rectifier. Similarly, a small proportional amount of the reflected microwave energy is drained off and rectified as for instance, in a crystal rectifier. The two outputs are fed differentially to the input of an amplifier, and the amplified output therefore, represents the unreflected energy. The amplified output is fed together with the rectified transmitted energy, differentially to a second amplifier, so that the final output represents the net power absorbed by the sample. This output as indicated on a meter will then bear a relation to the quality under measurement, and if the equipment has been calibrated, the method will permit rapid and easy quantitative estimation of that quality in an unknown sample.

The amplifier output may also energize an indicating meter, such as a milliammeter, for convenience in monitoring, although such a meter is not essential and may be omitted.

Materials which can be measured by this method and by the means described are limited to non-conductors and semi-conductors of electricity, and the state of aggregation is limited to granular materials or pulverized solids, liquids and any solid large piece of material, in which case it must be machined or otherwise formed to the shape of the test chamber. For instance, a few examples would be as follows, although it is readily apparent that the utility of the invention is not limited thereto: wheat, grain, grass seed, sand, pulverized desiccated potatoes, military explosive powder, transformer oil, insulating plastics in granulated or solid form.

The various features of novelty which characterize this invention are pointed out with particularity in the claims of this specification. For a better understanding of the invention, however, its advantages and the specific objects attained with its use, reference should be had to the accompanying drawings and descriptive matter, in which are illustrated and described preferred embodiments of the invention.

Of the drawings:

Fig. 3 is a diagrammatic representation of a further modification of the invention in which the power absorbed during passage through the sample is measured.

Fig. 4 illustrates schematically a conventional type of tuned wave guide crystal rectifier used for detection of microwaves.

Fig. 5 illustrates schematically a top view of a novel tuned wave guide crystal rectifier preferred for detection of microwaves.

Fig. 6 illustrates schematically a side view of the novel tuned wave guide crystal rectifier.

Figure 1:
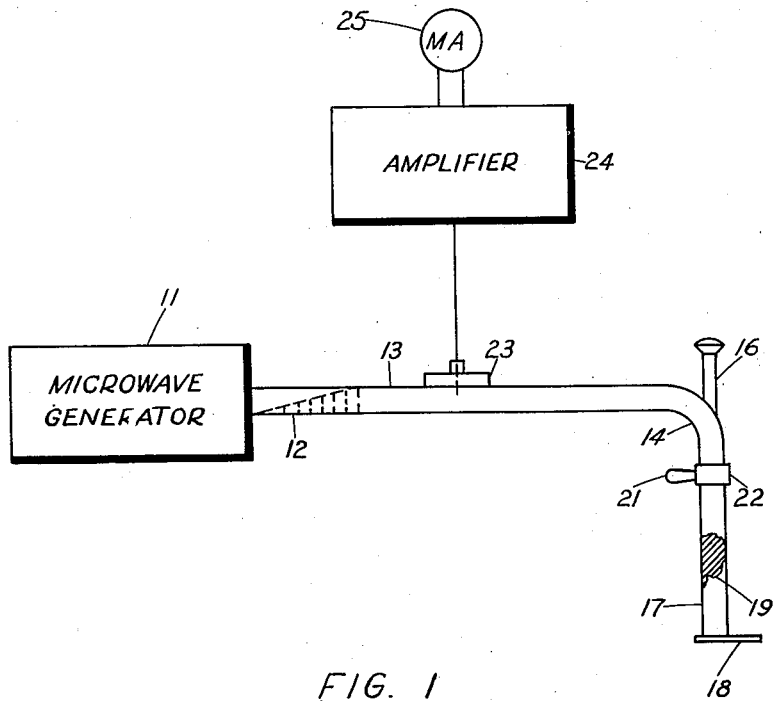
Fig. 1 is a diagrammatic representation of one form of the invention, in which the reflected wave is measured and the sample is contained in a vertical hollow wave guide.

A combination of equipment for attaining objects of this invention by means of reflected microwaves is shown in Fig. 1. Microwaves generated at 11 are led through a decoupling attenuator 12 to a hollow wave guide 13. The microwaves may be of any wavelength except that their wavelength should preferably be not less than 100 times the dimensions of granules and grains when granular aggregates are under test and not less than 100 times the dimensions of surface irregularities when solid block samples are under test. For example, as an illustration only and not excluding a wide range of other wavelengths, it has been found that in the case of small grains such as grass seed a microwave length in space of 3.20 centimeters provides very satisfactory operation.

Figure 2:
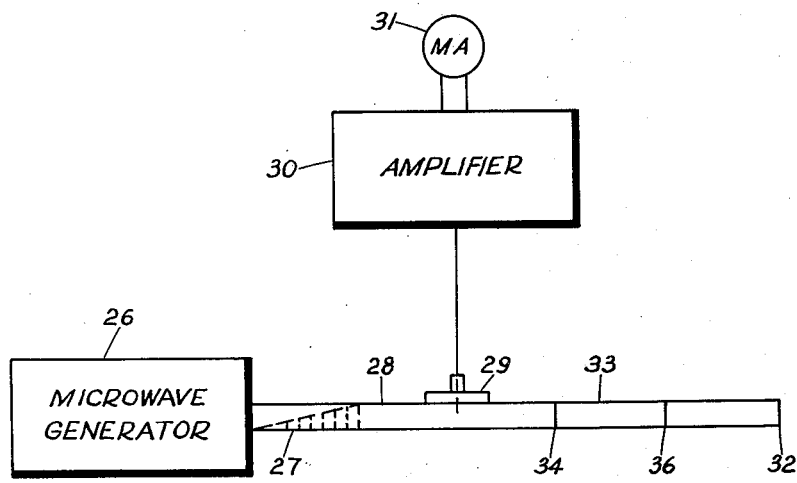
Fig. 2 is a diagrammatic representation of a modified form of the invention in which the reflected wave is measured and the sample is contained in an intermediate portion of the wave guide.

The decoupling attenuator 12 may preferably consist of a graphited card introduced a desired distance into a longitudinal slot in the wide side of the wave guide but may be of any other type of wave guide attenuator. The wave guide may be of any size generally used for the wavelength employed. For instance, for $\lambda = 3.20$ cm., it may be of rectangular brass tubing 0.4 inch x 0.9 inch in internal cross section, and as depicted in Figs. 1 and 2 of the drawings, the narrow dimension faces the observer and in Fig. 3 the wide dimension is presented to the observer.

Wave guide 13 is connected by non-reflecting, non-absorbing elbow 14 containing vertical funnel and orifice 16, to vertical hollow wave guide 17 terminating in slide valve 18. This valve serves as an electrical termination and also as an unloading port. Vertical hollow wave guide 17 serves not only as a continuation of wave guide 13 but also as a receptacle for the sample 19 to be measured. The orifice 16 serves as a loading port and a removable collar section 21 is provided to smooth the top of the charge, if granular, to a predetermined line 22 without pressing the sample charge down and thereby affecting its electrical qualities.

The sample chamber 17 should preferably be of such a length that when filled with the material to be tested substantially all of the microwave energy passing through the material is absorbed thereby so that the impedance presented by the termination 18 is rendered unimportant. For example, as an illustration only, in the case of small grains it has been discovered that where the length of the sample chamber 17 and hence the length of the charge in the direction of the propagation of the microwave energy is $5\lambda_g$ or over substantially all of the microwave energy propagated through and not reflected by the sample is absorbed thereby; where $\lambda_g$ is the microwave length within the wave guide.

Where the vertical sample chamber section 17 is made of this length and hence the termination 18 rendered unimportant the sample chamber may be made tapered at its lower end or otherwise restricted but at the same time provided with an opening therein so that a continuous stream of dielectric material may be passed through the sample chamber, the rate of pouring and of evacuation being such as to keep the level of the material up to the collar 22. In such a case a recording meter may be substituted for the meter 25 or if merely the average of a large sample is desired an integrating meter may be utilized.

Waves generated at 11 are conducted to the sample 19, where some of the energy is reflected and some is absorbed or transmitted, the degree of reflection depending on the degree of conductivity of the sample. The reflected energy travels back along hollow wave guide 13 and in cooperation with the originally generated microwaves produces standing waves in hollow wave guide 13. These are detected by probe and rectifying detector 23, which might alternatively be any of the other well-known devices, such as a loop or a hole, combined with any suitable type of rectifier, for detecting microwaves in a hollow wave guide. The output of the probe and rectifying detector actuates amplifier 24 and milliammeter 25. In place of amplifier 24 and milliammeter 25, any other known device may be used to indicate or record the magnitude of energization by probe 23. Probe and rectifying detector 23 may be at any fixed position in the region of standing waves and because variations in the electrical conductivity of sample 19 will produce changes in the phase or positions of maximum potential along wave guide 13 and also because these variations in the sample will produce variations in the amount of energy reflected and hence in the maximum magnitude of the standing potential waves, probe and rectifying detector 23 will be affected by the standing waves in accordance with the conductivity of sample 19. Amplifier 24 and milliammeter 25 will be correspondingly affected and the readings of the latter, when calibrated by use of known samples, will serve in estimating the conductivity of the unknown sample and of those changes in quality or moisture causing changes in conductivity. The decoupling attenuator 12 prevents the energy reflected from the sample 19 from being again reflected from the generator 11 which would result in multiple reflection of energy and adversely affect the accuracy of measurement.

A modified form of equipment for attaining objects of this invention by means of reflected microwaves is shown in Fig. 2. It differs from Fig. 1 principally in the chamber for holding the sample, this chamber being in Fig. 2 in an intermediate position in the hollow wave guide and not at its end. It also need not be vertical.

In Fig. 2 microwaves generated in microwave generator 26 are led through decoupling attenuator 27 to hollow wave guide 28. This generator, decoupling attenuator and hollow wave guide are similar in construction, function and exampled dimensions to generator 11, decoupling attenuator 12 and hollow wave guide 13 of Fig. 1. Hollow wave guide 28 is terminated electrically and mechanically in load termination 32, the impedance of which should preferably equal the characteristic impedance of the guide. Intermediate in the guide is probe and rectifying detector 29 with amplifier 30 and milliammeter 31, all similar in construction and function to probe and rectifying detector 23, amplifier 24 and milliammeter 25 of Fig. 1. Also intermediate in the guide is sample chamber 33, with dielectric ends 34 and 36 transparent to microwaves but mechanically containing the sample between them.

Microwaves traveling to the right in hollow wave guide 28 and meeting the sample in chamber 33 are reflected, absorbed and transmitted. Again as in the case of the system of Fig. 1, if the length of chamber 33 is made sufficient substantially all of the energy propagated through the sample and not reflected thereby is absorbed and the electrical nature of termination 32 is unimportant. The reflected energy affects the probe and rectifying detector 29 to a degree depending on the conductivity of the sample, hence the indication of amplifier 30 and milliammeter 31, when calibrated by use of known samples, will serve in estimating the conductivity of the unknown sample and hence the quality of material or degree of moisture determining the conductivity.

In Fig. 3 there is shown a further modification for accomplishing the purposes of this invention by means of transmitted microwaves. Microwaves generated in microwave generator 37 are led through decoupling attenuator 38 to hollow wave guide 39. This generator, decoupling attenuator and hollow wave guide are similar in function, construction and exampled dimensions to the generator 11, decoupling attenuator 12 and hollow wave guide 13 of Fig. 1.

The microwaves generated by the generator 37, after passing through decoupling attenuator 38 into guide 39, meet directional coupler 41 which bleeds from guide 39 a small proportional part of the microwave energy and delivers it to crystal rectifier 42, the output of which is connected to ground through resistor 40. The drop in resistor 40 is then proportional to the voltage output of crystal rectifier 42 and therefore, is a function of the generated microwave energy affecting directional coupler 41. However, the greater part of the generated microwave energy proceeds along hollow wave guide 39. It passes directional coupler 43 and enters sample chamber 44 contained in the guide by dielectric ends 46 and 47. In the sample contained in chamber 44 the microwaves are reflected, absorbed and transmitted. The part transmitted enters matched attenuator 48, which may be, for example, of 20 db attenuation and should preferably be matched to both the sample chamber and to the following output crystal rectifier 49. The direct current output of crystal rectifier 49 is connected to ground through resistor 55, the drop through which is thus proportional to the voltage output of crystal rectifier 49 and therefore, is a function of the transmitted microwave energy affecting this rectifier.

That part of the microwaves reflected from the sample in chamber 44 loses a small proportional part of its energy to directional coupler 43, but the greater part continues past 43, passes directional coupler 41 and enters decoupling attenuator 38, where it is largely absorbed. That proportional part of the microwaves deflected into directional coupler 43 is delivered to crystal rectifier 54, the direct current output of which is led through resistor 45 to ground. The drop in resistor 45 is then proportional to the voltage output of crystal rectifier 54 and therefore is a function of the reflected microwave energy affecting directional coupler 43.

Terminal 65 of resistor 40 and terminal 70 of resistor 45 are connected to resistor 56 and to the input terminals of a direct current amplifier 57, so that the latter is actuated by the difference of the voltages on terminals 65 and 70.

The output terminals of amplifier 57 are connected through indicating meter 58 to resistors 60 and 75 and to battery 80, so that the indication of meter 58 and the potential drop across resistor 60 are proportional to the amplifier voltage input, which in turn represents the difference between the generated microwave energy and the reflected microwave energy. Meter 58, is, however, not essential.

Terminal 85 of resistor 60 and terminal 90 of resistor 55 are connected to resistor 51 and to the input of direct current amplifier 52, so that the latter is actuated by the difference of voltages on terminals 85 and 90, representing respectively the difference of generated and reflected microwave energies, and of transmitted microwave energy, and representing therefore the energy absorbed in sample chamber 44. The amplifier output of amplifier 52 thus representing the absorbed energy, is indicated on meter 53, which may be a milliammeter. Since the energy absorbed by the sample is a function of its conductivity which in turn depends on the proportion of water or on the quality of the sample, these may be quantitatively indicated by meter 53 and estimated therefrom if the equipment has been calibrated in terms of known samples.

Those elements designated as crystal rectifiers 42, 49 and 54 may be of any tuned wave guide type of detector, whether or not employing crystals, suitable for quantitatively detecting or rectifying microwaves to direct current but they are preferably crystal rectifiers of an improved and novel type employing superior construction and having greater ease of adjustment than those crystal rectifiers heretofore available.

The usual construction heretofore available is shown diagrammatically in Fig. 4 which depicts a crystal rectifier contained in a closed-end wave guide 61 with coupling flange 62 at the open end and at the other end an adjustable shorting plug termination 63. This termination is mechanically intricate and is expensive to construct. Adjustable matching stubs 64 and 66 are provided between flange 62 and a crystal rectifier 67 and a direct current output terminal is provided at 68. The distance from crystal rectifier 67 to electrical termination 63 is varied by adjustment of the latter, and this is customarily considered as matching the reactive component of the crystal impedance. The resistive component of the crystal impedance is considered to be matched by either stub 64 or stub 66, and the correct stub to use is ordinarily found by trial, the other being withdrawn from the guide.

The functions of these three adjustments are ordinarily considered to be to secure the maximum response from the crystal rectifier, while adjusting the impedance looking into the wave guide detector unit at coupling 62 to appear like pure resistive impedance of value equal to the characteristic impedance of the wave guide employed. They require readjustment whenever the crystal rectifier unit is replaced to rematch the new unit's different impedance.

The improved and preferred construction is disclosed in top view Fig. 5 and in cross section in Fig. 6, taken on line 6—6 of Fig. 5. These figures depict a closed-end wave guide with coupling flange 71 on the open end and the other end closed by a rectangular brass plate 72. The guide illustrated is for approximately 3.20 cm. waves and is a rectangular brass tube 0.4 inch by 0.9 inch in internal cross section dimensions, but these dimensions, the wavelength and the material are for illustration only and may be whatever is desired for use in the microwave spectrum.

The main elements of the detector comprise matching stubs 74 and 76, a short circuiting rod 77 and a crystal rectifier 73 provided with a direct current output terminal 78. For most effective results these elements should be spaced one from the other by distances which depend on the wavelength of the signal in the wave guide which may be expressed by the following formulae but which may vary by as much as 20% without unduly affecting the action of the detector.

Distance from the closed end 72 to the rear matching stub 74, $$\frac{\lambda_g}{8}$$

Distance from the rear matching stub 74 to the crystal rectifier $$\frac{3\lambda_g}{8}+N\frac{\lambda_g}{2}$$

Distance from a plane passed through the axis of the crystal rectifier 73 normal to the side walls of the wave guide to a similar plane passed through the axis of short circuiting rod 77, $$\frac{\lambda_g}{8}+N\frac{\lambda_g}{2}$$

Distance from the aforesaid plane passing through the axis of the short circuiting rod 77 to a similar plane passing through the axis of the forward matching stub 76, $$\frac{\lambda_g}{2}+N\frac{\lambda_g}{2}$$

where $\lambda_g$ is the wavelength in the wave guide and N is any positive integer including zero.

Additionally the distance between the short circuiting rod 77 and one of the sidewalls of the wave guide, which may be either sidewall, should not be less than $$\frac{\lambda_g}{2}$$

The matching stubs 74 and 76 are arranged to project into the wave guide 69 and are rigidly fastened at their outer ends to cap members 87 and 88 which bear internal threads 89 and 91. Studs 92 and 93 are rigidly fastened to the wave guide 69 and are each provided with external threads 94 and 96 cooperating respectively with the internal threads 89 and 91 on cap members 87 and 88 whereby rotation of these cap members permits variable amounts of penetration of the wave guide by matching stubs 74 and 76. The short-circuiting rod 77 is securely fastened into the two broad sides of the guide so as to make good electrical contact with each and may be on either side of the center line. As is well understood in the art, it is desirable to employ quarter-wave trapping slots as shown at 79, 81, 82 and 83 to minimize leakage of microwave energy from openings in the guide, and to have good electrical contact by means of sliding spring contacts 84 and 86.

Since this detector has only two adjustments, whereas previous detectors (Fig. 4) necessitated three, the adjustments in each case being mutually interdependent, it is readily apparent that a material advantage is gained by reducing their number from three to two.

In operation, the two stub adjustments will compensate for differences between individual detector crystals of a given design, and also will permit compensation for up to 4% variation of the frequency from the design value. While the exact theory of operation is not known, tests indicate that regulation of stub 74 compensates for variations in reactance, producing an effect as if electrically the conductive termination 72 were moved to some point between 0 and $$\frac{\lambda_g}{2}$$

toward the detector. Likewise regulation of stub 76 compensates for variations in resistance of the detector crystal. When this stub 76 is withdrawn so as not to protrude into the guide, it has no effect and the shorting rod 77 produces the effect of a shunt inductive reactance. As the stub 76 is screwed into the guide, it adds an effect of shunt capacitive reactance and this effect appears as if it were in the axial location of shorting rod 77. As the stub 76 is screwed further in, it comes to a point where it exactly neutralizes the effect of the shorting rod. Beyond that point it produces net capacitive reactance effect.

This construction thus permits adjustment to secure maximum effect upon the rectifier, while presenting to incoming waves at coupling 71 a purely resistive termination of an impedance value which equals the characteristic impedance of the guide. This detector therefore, performs exactly the same functions as does the three-adjustment detector. It secures the maximum rectifying detector response, while terminating the wave guide in its characteristic impedance as seen from coupling 71. It requires readjustment whenever the crystal rectifier unit is replaced, to rematch the new unit's different impedance. A detector of this improved type constitutes the subject matter of applicant's copending application, Serial No. 88,269, filed April 19, 1949.

Although hollow wave guide construction throughout is used for illustration, construction need not be restricted to this type of guide except in the sample chamber. In other parts of the system any other suitable type of guide may be employed, such as dielectric rods, concentric cable or transmission lines.

What is claimed is:

1. A system for measuring variations in dielectrics which have the characteristics of reflecting variable amounts of microwave energy depending on the dielectric quality thereof comprising, a microwave generator for producing signal energy having a predetermined wavelength in the microwave region, a hollow wave guide connected to said microwave generator on which the signal energy produced by said generator is impressed, a sample chamber forming the termination for said wave guide, a dielectric sample contained in and filling said sample chamber, a decoupling attenuator located in said wave guide section for preventing multiple reflection of the signal energy impressed thereon, a microwave detector positioned intermediate said decoupling attenuator and said sample chamber and measuring means connected to the output of said detector.

2. A system as defined in claim 1 in which said sample chamber and the dielectric sample filling said chamber has a length in the direction of the propagation of said microwaves such that substantially all of the energy passing through the dielectric material is absorbed, whereby the characteristic impedance of the wave guide termination is determined by the nature of the dielectric sample contained in said sample chamber.

3. A system for measuring variations in dielectric material which has the characteristic of reflecting variable amounts of microwave energy depending on the dielectric quality thereof comprising, a microwave generator producing signal energy having a predetermined wavelength in the microwave region, a microwave transmission circuit including a container for receiving said dielectric material connected to said microwave generator and having said signal energy impressed thereon, said container and the dielectric material received therein having a length in the direction of the propagation of said microwave energy such that substantially all of the signal energy passing through said dielectric material is absorbed, and means connected to said microwave transmission circuit for measuring the amount of signal energy reflected from the dielectric material enclosed in said container.

4. A system as defined in claim 3 in which said container and the dielectric material enclosed therein form the termination of said microwave transmission circuit.

JOHN F. ZALESKI.

REFERENCES CITED

The following references are of record in the file of this patent:

UNITED STATES PATENTS

| Number | Name | Date |
|---|---|---|
| 2,266,114 | Bartlett | Dec. 16, 1941 |
| 2,403,289 | Korman | July 2, 1946 |
| 2,404,797 | Hansen | July 30, 1946 |
| 2,413,939 | Benware | Jan. 7, 1947 |
| 2,420,892 | McClellan | May 20, 1947 |
| 2,422,742 | Odessey | June 24, 1947 |
| 2,423,383 | Hershberger | July 1, 1947 |
| 2,455,941 | Muskat et al. | Dec. 14, 1948 |
| 2,463,297 | Muskat et al. | Mar. 1, 1949 |
| 2,477,347 | Posey | July 26, 1949 |
| 2,530,248 | Larson | Nov. 14, 1950 |

OTHER REFERENCES

Journal of Applied Physics, June 1946, pages 495-500, "The Absorption of Microwaves by Gases," by Hershberger.

General Electric Review, September 1947, pages 34-39.